United States Patent [19]
De Roeck

[11] Patent Number: 5,908,173
[45] Date of Patent: Jun. 1, 1999

[54] WINDING CORE

[75] Inventor: Joseph De Roeck, St.Katelijne-Waver, Belgium

[73] Assignee: Agfa-Gevaert, Mortsel, Belgium

[21] Appl. No.: 08/979,225

[22] Filed: Nov. 26, 1997

Related U.S. Application Data

[62] Division of application No. 08/773,187, Dec. 27, 1996, Pat. No. 5,816,525.

[30] Foreign Application Priority Data

Jan. 10, 1996 [EP] European Pat. Off. ............ 96200049

[51] Int. Cl.$^6$ .................................... B65H 75/18
[52] U.S. Cl. ...................... 242/609.4; 242/610.4
[58] Field of Search ................ 242/609, 609.4, 242/610.1, 610.4, 613, 118.8, 118.7; 428/36.5, 36.91, 906

[56] References Cited

U.S. PATENT DOCUMENTS

| | | | |
|---|---|---|---|
| 2,020,172 | 11/1935 | Cotchett | 242/118.7 |
| 3,070,281 | 12/1962 | Durkin et al. | 242/118.7 |
| 3,179,245 | 4/1965 | Bastian | 242/613 |
| 3,592,406 | 7/1971 | Martin et al. | 242/610.4 |
| 4,021,001 | 5/1977 | Sproat | 242/610.4 |
| 4,182,500 | 1/1980 | Schlicker | 242/118.7 |
| 4,695,008 | 9/1987 | Dabrowski | 242/610.4 |
| 4,697,757 | 10/1987 | Nakaya et al. | 242/610.4 |
| 4,832,276 | 5/1989 | Gebhardt et al. | 242/610.4 |
| 4,893,764 | 1/1990 | Juntunen | 242/610.4 |
| 5,441,212 | 8/1995 | Dicken et al. | 242/613 |
| 5,535,961 | 7/1996 | Duckworth et al. | 242/610.4 |
| 5,645,942 | 7/1997 | Sutoh | 428/906 |
| 5,653,401 | 8/1997 | Biagiotti | 242/532.3 |

Primary Examiner—John M. Jillions
Attorney, Agent, or Firm—Baker & Botts, L.L.P.

[57] ABSTRACT

Winding core (10) for the winding of a web of pressure-sensitive material, which has a bituminous covering (23) which affords a supporting pressure for at least the central portion of the web which is uniform over the circumference of the core.

5 Claims, 4 Drawing Sheets

WINDING CORE

This is a divisional of application Ser. No. 0/08/773,187 filed on Dec. 27, 1996 now U.S. Pat. No. 5,816,525.

BACKGROUND OF THE INVENTION

1. Field of the Invention

The present invention relates to cores for winding webs of delicate material. More in particular, this invention relates to a method and a core which reduce core impressions in the winding of photographic film and paper.

2. Description of the Prior Art

Core impressions are a major source of waste when winding webs paper or film on cores which serve in the production process for winding such paper or film after its passage through coating and drying stations, and for its storage until it is unwound in order to be longitudinally slit and transversely cut so that small rolls or sheet stacks are obtained that fit in the end-user's exposure apparatus.

Core impressions, also called "first winding defects", are caused by the leading edge of a wound web which causes a pressure mark in the second winding of the web at the place where the latter is in contact with this leading edge. The contact pressure at such place is high since in the region of said edge the second winding is in supporting contact with the first winding on one side only of the leading edge, there being no first winding support at the other side. The increased local pressure on the second winding causes a distortion of such winding which on its turn affects the third winding, and this the still next one, etc.

The caused damage can be a surface defect, such as impressions or scratches, but usually it will be so-called pressure fog which is a local desensitization of (a) light-sensitive layer(s) as a consequence of increased mechanical pressure.

The mentioned defect extends in practice from a few up to 100 or even more windings of a roll of wound material, the satisfactory recovery of which is mostly excluded because of the number of differently sensitized and/or coloured layers involved.

It is disclosed in the art to provide the core with a covering of elastically or plastically deformable material which deforms to accomodate the leading edge so that the first turns of a web on a core do not have to deform to accomodate the irregularity caused by the leading web edge.

We have found that none of both materials provides entirely acceptable results in practice. The expression "elastically deformable" points to a relation between pressure and thickness of a layer and this means that, although the covering in question now allows the leading end of the wound web to (partially) enter the covering, there will be a local increased pressure on the next winding(s) caused by the compressed material, whereby the aimed improvement is only partly obtained.

In the case of a plastically deformable covering, it is theoretically possible that a core covering could be deformed in such a way as to completely accomodate a leading web end thus offer a uniform supporting pressure for the next web winding(s). However, this situation can occur only once since in a next winding operation the leading web edge will inevitably take another angular position whereby not only the leading web edge but the plastically deformed core as well will damage the next windings of the web.

SUMMARY OF THE INVENTION

Object of the Invention

It is the object of the present invention to provide a method and a winding core for reducing core impressions in the winding of photographic film and paper.

Statement of the Invention

In accordance with the present invention, a method for reducing core impressions in the winding of a web on a winding core which comprises providing a medium between the core and the first winding of the web which affords a supporting pressure for the web which is uniform over the circumference of the core, is characterised therein that said medium is gaseous and is provided between the core and the first web winding after the winding of the web has been completed.

The core can be provided with peripheral sealing means at its ends to reduce loss of air. The core can further be provided with peripheral supporting means at its ends having a diameter very slightly larger than the core, and such core can be used for winding webs with knurled margins, the knurled margins being located on such larger diameter core ends.

The invention feature is based on our finding that the "first winding defect" is time-dependent and, even more important, that it starts to manifest itself in a noticeable way only after a complete roll has been wound.

The consequences of our finding are interesting since it now becomes possible to use existing winding installations without any modification to them. It is only after a wound roll of web has been removed from a winder that the treatment according to the invention must be applied. Wound rolls of web which have to be stored in any way in a storage room under controlled conditions of temperature and relative humidity, pending their unwinding for further treatment such as slitting and cutting, can thus be subjected to the inventive treatment while in a stationary position which considerably facilitates this operation as compared with such treatment on a winder.

The invention comprises also a winding core for winding a web of pressure-sensitive material, which core is characterised by a covering of a viscous deformable material.

According to one embodiment, said covering is a layer of a bituminous substance which can suitably be screened from direct contact with a wound web, e.g. by means of a thin plastic coating. Suitably such layer is arranged for easy removal from the core in case of defect and such removal may be facilitated if an easy-peelable layer is provided between the core and such bituminous layer.

A method and device for winding webs on a rotating core are known from DE 37 29 448 A1 which teaches providing a perforated core with an air cushion after a few windings have been wound. The air cushion then has to be maintained during the further winding of the core. This operation requires extra bores and connections in the winding turret in order to provide the rotating core continuously with pressurized air during its rotation.

BRIEF DESCRIPTION OF THE DRAWINGS

The invention will be described hereinafter by way of example with reference to the accompanying drawings, wherein.

DETAILED DESCRIPTION OF THE INVENTION

Figure 1:
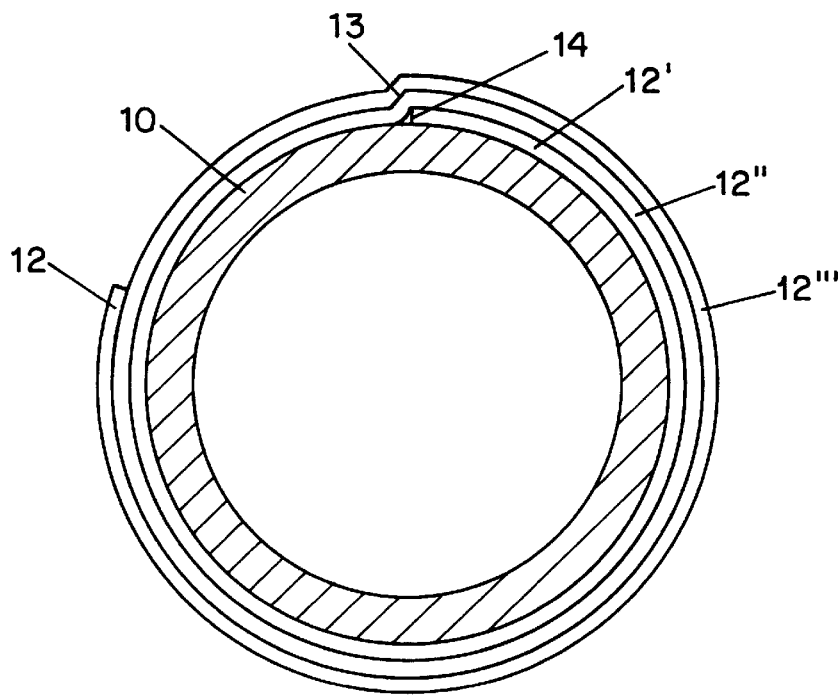
FIG. 1 is a cross-sectional view of a web wound on a common hard core.
Figure 2:
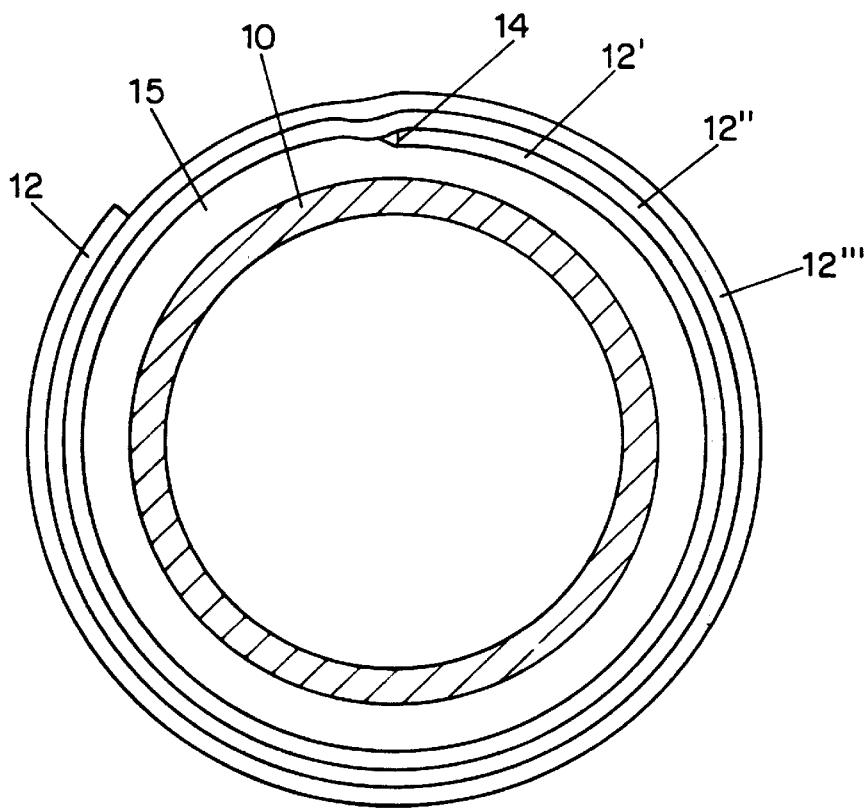
FIG. 2 is a cross-sectional view of a web wound on a conventional core provided with an elastically deformable layer.
Figure 3:
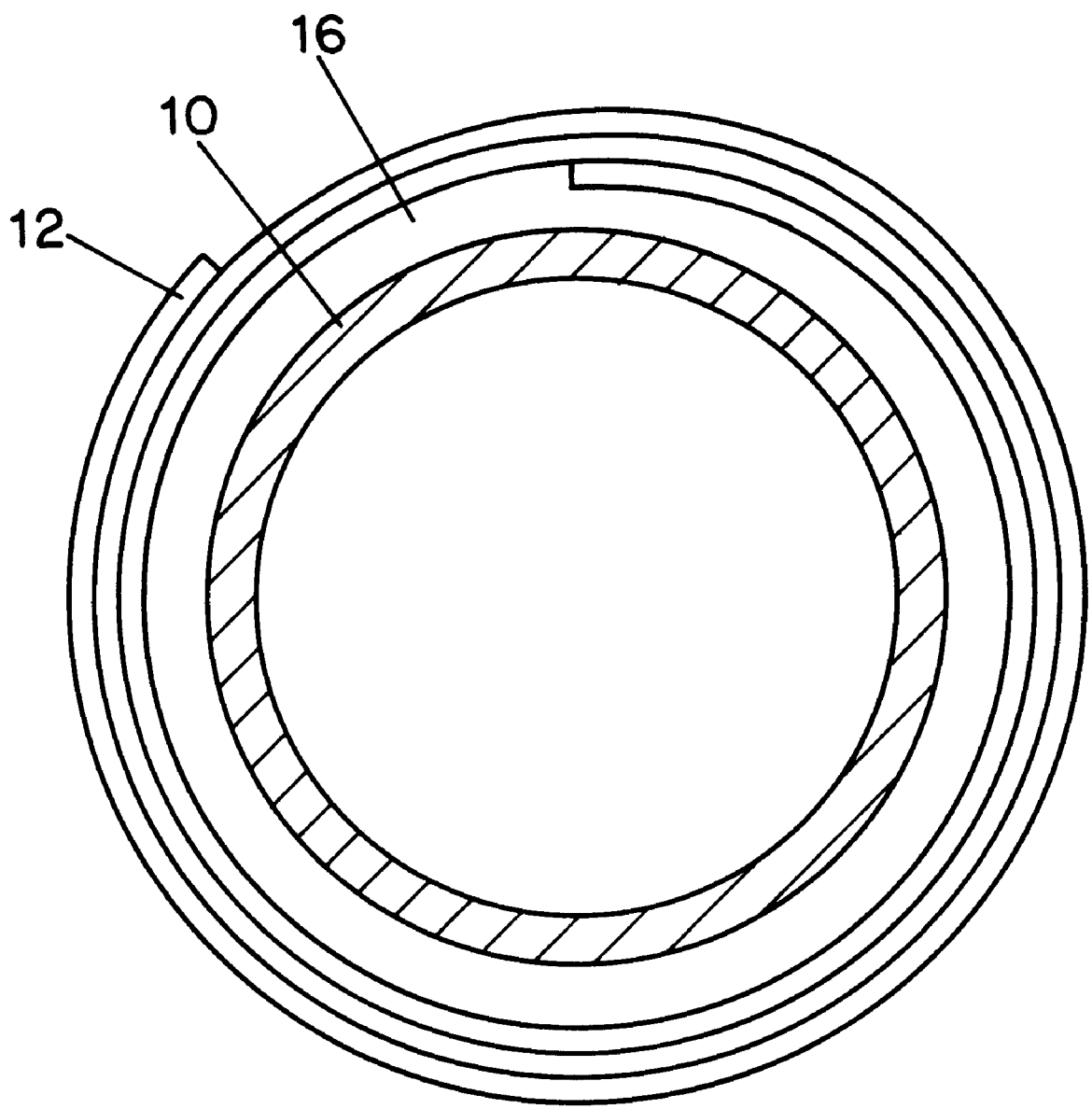
FIG. 3 is a cross-sectional view of a web wound on a conventional core provided with a plastically deformable layer.

FIGS. 1, 2 and 3 illustrate cores causing core impressions in a wound web.

FIG. 1 is a cross-sectional view of a conventional rotatable winding core 10 journalled in a winding turret or the like, made of a hard material such as aluminium or fibre-reinforced polyester, onto which a web 12, e.g. a film of polyethylene terephthalate or triacetate, or a paper support, onto which one or a plurality of light-sensitive or thermal-sensitive layers have been coated, is being wound. Since the web is elastically deformable, the second winding 12" overlying the first one 12' has a deformation 13 caused by the leading edge 14 of the web which provides support for the next winding at the right-hand side only according to the figure, there being no support at the opposite side for this second winding over an angular distance which can range from a few to some tens of millimetres, depending on the stiffness of the web, the radius of curvature and the winding tension. The increased surface pressure on winding 12" at the region of deformation 13 causes damage of the light-sensitive layer(s) which becomes visible after exposure and development of the material. The same applies to the third winding 12''', etc. Since a usual core diameter amounts to approximately 30 cm, and up to ten or more windings can be affected by the described defect, it is clear that the amount of valuable material that can be lost is not negligible.

FIG. 2 is a cross-sectional view of a conventional winding core 10 which is provided with a covering in the form of an elastically deformable layer 15. The thickness of such layer can range from 0.2 to several millimetres. Suitable materials are soft foam materials such as closed or open cell polystyrene, polyethylene or polyurethane. It is clear that the deformation of the second 12", the third 12''', and further wound layers of web 12 is much smaller than in the FIG. 1 embodiment. Increased pressure will nevertheless still be present at the region of leading edge 14 since the increased local compression of layer 15 will produce a correspondingly higher pressure on the corresponding region of the first web winding, and thus also on the next layers, to a decreasing extent.

FIG. 3 is a cross-sectional view of a conventional winding core 10 which is provided with a covering in the form of a plastically deformable layer 16. The shape of layer 16 can have been obtained by properly pre-shaping said layer but it can also, and even preferably is, obtained spontaneously by the winding of web 12. Because of its plastic deformation, this layer perfectly conforms to the first winding of the web and thus its supporting pressure is in principle equal all over the circumference of .the core. However, the described configuration is theoretical since a perfect match as shown does not exist in practice. Further, after unwinding the web and winding a next one, it is practically impossible to locate the leading edge of such next web in the corresponding depression produced in layer 16. Location of the leading web end on a non-depressed angular portion of the covering, in combination with the discontinuity formed by the leading edge of the new web will produce twice the number of pressure marks as compared with the FIG. 1 core.

Figure 4:
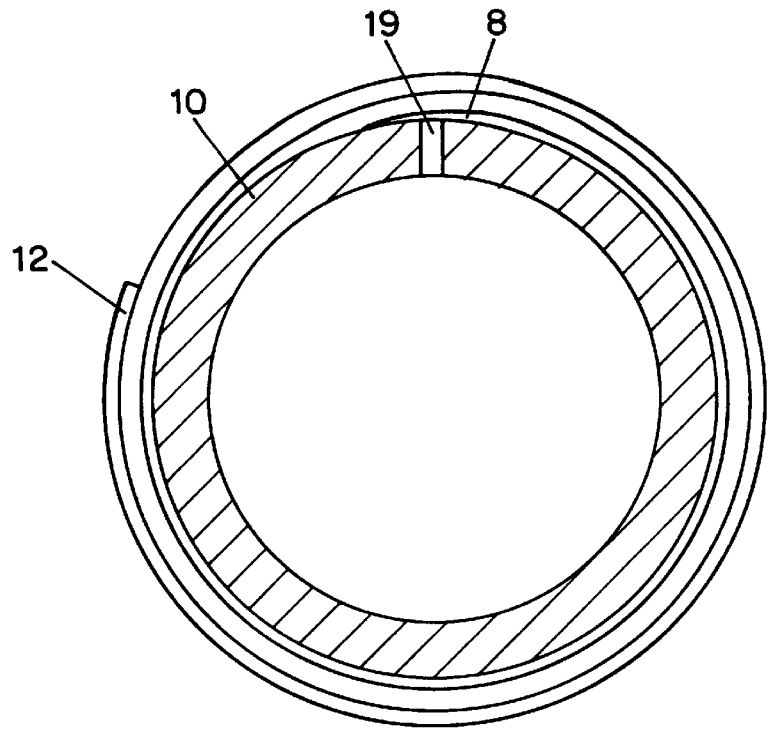
FIG. 4 is a cross-sectional view on line 4—4 of FIG. 5 of a core for use in one embodiment of the method according to the invention for reducing core impression.
Figure 5:
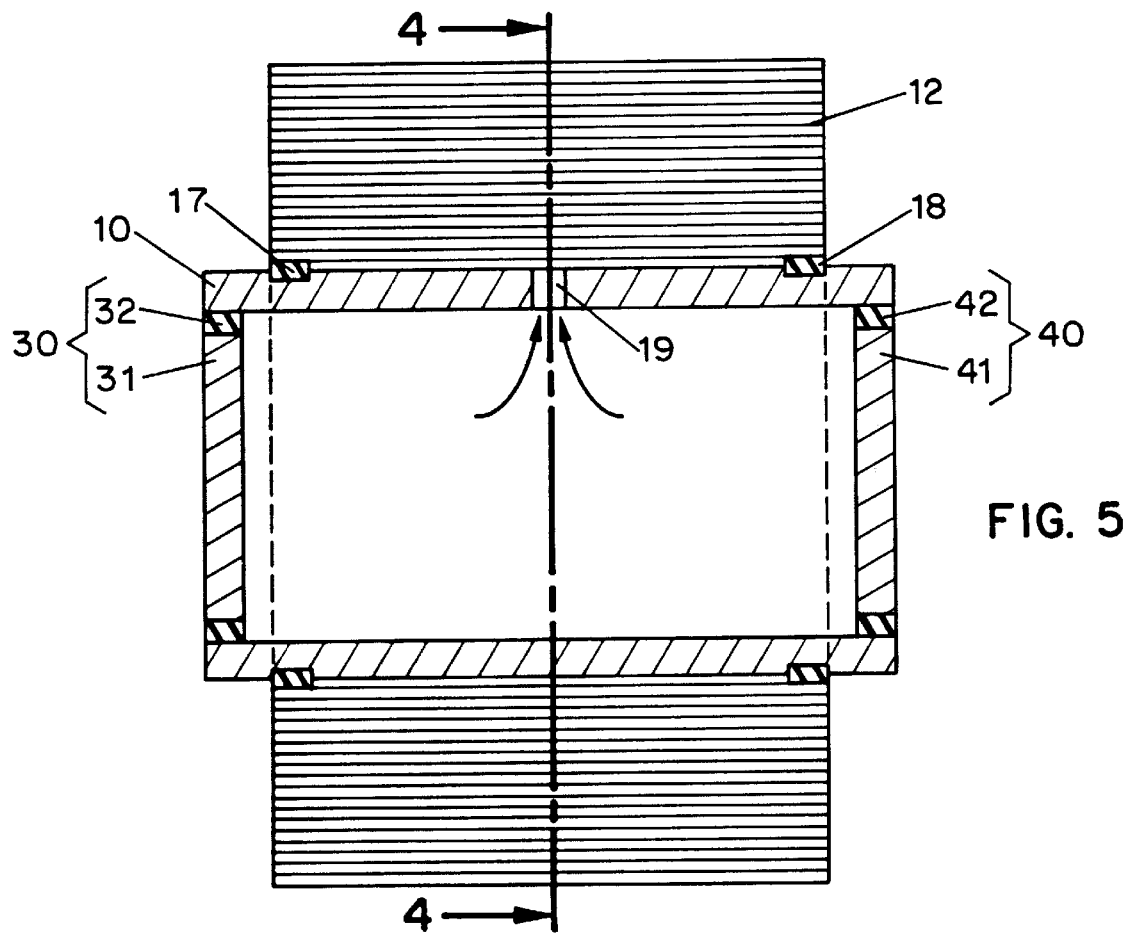
FIG. 5 is a longitudinal sectional view of the core of FIG. 4.

A first embodiment of an improved winding core according to the invention is shown in FIGS. 4 and 5.

A core 10 which may be a winding core used in the production process of a photographic film, is provided with two peripheral rings 17, 18 from a resilient material such as solid rubber or a polymer such as cellular polyurethane or silicone rubber bonded to the core by a suitable glue or fitting in a corresponding groove of the core. The axial distance between the rings is such that a knurled film 12 wound on the core is with its knurled margins in contact with the rings. Web knurling is well known in the art and is used for reducing the pressure between successive roll windings between the margins, and for preventing telescoping deformation of a roll. The knurled margins are trimmed from the film at the moment it is unwound for being slit in smaller widths and cut to the required sizes. A particular interesting technique for edge knurling a thermoplastic film is disclosed in U.S. Pat. No. 4,304,750 assigned to the assignee of the present application.

Core 10 is provided with a radial opening 19 which can be located centrally of the core but which can also take other positions and/or can be replaced by a plurality of openings distributed over the surface of the core. The described opening(s) can be easily provided in cores currently in use in the winding process and does not alter the normal use of the cores. The core ends are closed by means not shown, so that pressurized air can be fed in the core. Such closure means can be formed by pistons having an annular elastomeric sealing ring which are urged in the ends of the core, by flanges which are urged against the core ends by an axial pulling rod, etc.

Pressurized air fed into the core flows through opening 19 and forms a supporting air cushion for the wound web between lateral rings 17, 18. Contrary to what FIG. 4 might suggest, this air support is not limited to the wedge-like space 8 but extends instead completely around the core. The separation between the first winding and the core amounts to approximately 5 $\mu$m and because of this very small distance it has not been shown on the drawing.

The following example illustrates the described embodiment.

A polyethylene terephthalate film with a width of 1.73 m, a thickness of 0.10 mm and having a plurality of light-sensitive layers coated thereon was wound on a core with a diameter of 30 cm and a length of 1.95 m.

The film was provided with knurled margins, the knurling width being 15 mm and the knurling height 12 $\mu$m. The film length amounted to 4000 m and approximately 2400 windings of film were wound, the diameter of the film roll amounting to 77 cm.

The film roll thus wound, was removed from the winding turret, the core ends were closed and the core was connected to a supply of pressurized air. Air pressure was kept at 4 bar.

It was found that air consumption amounted to 3 $L.hr^{-1}$. The roll treated as described was kept for 30 days in a storage room at 20° C. and 60% relative humidity. Then the roll was unwound and the first 100 windings were visually inspected under oblique-light conditions for retrieval of first winding defects. It was found that the first five windings only were defective, as compared with approximately 100 windings if winding occurred in a conventional way.

Figure 6:
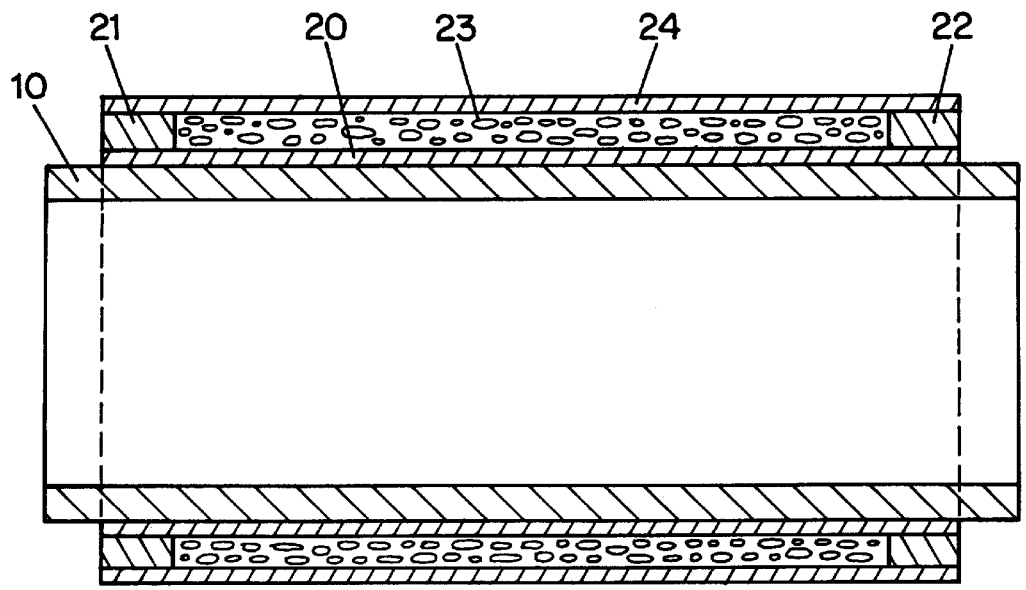
FIG. 6 is another embodiment of a core for reducing core impression.

FIG. 6 is a longitudinal sectional view of another embodiment of a winding core according to the invention.

A common winding core 10 is provided with a peelable layer 20 the function of which is to allow easy removal of the covering from the core if such covering would have become damaged during use of the core. Next two windings 21, 22 of relatively stiff two-sided pressure-sensitive tape are wound on the core to provide marginal supporting zones for a wound web. Then a layer 23 of a bituminous varnish was applied on layer 20 by spray coating. Immediately after spraying, the release paper of the tapes was removed and after drying of layer 23, a protective skin in the form of a layer 24 was sprayed on the bituminous layer and on the exposed adhesive of the tapes.

The following data illustrate the example hereinbefore.

core 10: polyester core, diameter 30 cm, length 1.95 m layer 20: peelable varnish, Type 1 for airless, sold by Rust-O-Leum protective coatings, Roosendaal, Netherlands, tapes 21, 22: double side pressure-sensitive polyester tape, width 25 mm, thickness 0.5 mm, manufactured by Tesa, Beiersdorf, Germany, layer 23: bituminous varnish made by ESSO under the Trade Name Adhesion primer, suitably thinned for spray application, dry-layer thickness 0.25 mm, and layer 24: acryl varnish sold under the Trade Name CRYLPOP+ by Asphaltco n.v., 1830-Machelen, Belgium.

The core thus prepared was used for the winding of photographic film of the type as described hereinbefore with respect to FIGS. 4 and 5. Winding occurred at a usual initial winding tension of 700 N per meter width. A complete film roll comprised 4000 meters of film.

Core impression was evaluated after a storage period of 30 days. It was found by visual inspection that now approximately 6 windings only of the wound film were defective, as compared with more than 100 windings if the film was wound under the same circumstances directly onto core 10. The behaviour of the new core was not limited to its first use, since even after tens of films had been wound and unwound, each winding inevitably starting at a different angular position, the same improvement was noticed.

Figure 7:
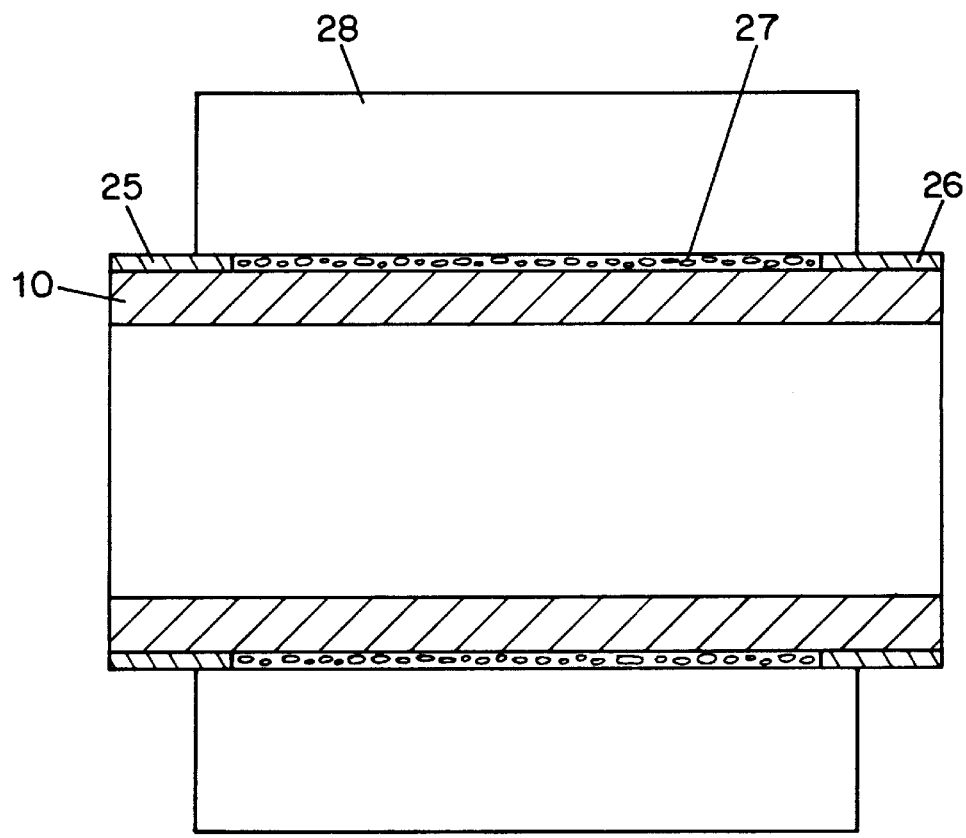
FIG. 7 is still another embodiment of a core which is provided with a covering of a deformable material.

FIG. 7 shows still another embodiment of the invention. A core 10 was provided with two metal rings 25, 26 cut from sheet steel and suitably fitted to the core surface. Between the rings a layer 27 of a resilient material was provided, in the present example a layer cut from rubber sheet with a Shore hardness of 30. The thickness of the rings and of the resilient layer amounted to 1 mm. A film 28 was wound on the core its margins being supported by rings 25 and 26. It was found that with this construction approximately 15 windings of the wound film were defective, as compared with more than 100 windings if winding was performed on a conventional core.

The invention is not limited to the embodiments described hereinbefore.

Improved winding results are obtained also for film without knurled margins, and for paper webs.

No details have been given hereinbefore about the actual form of the leading edge of a wound web, and thus it might be supposed that such edge is cut at a right angle. However, it is known in the art to cut the leading edge of a web at an acute angle so that such edge is angularly wrapped around the core whereby the cutting of the web may become easier and core impression be reduced. We have found that also for webs having a leading edge cut at an acute angle, the method according to the invention constitutes a valuable improvement.

We claim:

1. A winding core for use for the winding and storage of a web of pressure-sensitive material and having a peripheral covering which affords a supporting pressure for at least the central portion of the web, the covering being uniform over the circumference of the core and being of a material that is viscous deformable at the time of winding and during storage of the pressure-sensitive material.

2. The winding core according to claim 1, wherein said viscous deformable material is a bituminous substance.

3. The winding core according to claim 2, wherein said bituminous substance is provided with a skin so as to avoid direct contact of the wound web with the bituminous substance.

4. The winding core according to claim 1, wherein a layer is provided between said core and said covering which allows easy removal of the covering from the core in case of a defect in the covering.

5. The winding core according to claim 4, wherein said layer is a peelable layer.

* * * * *